United States Patent [19]

Gonzalez et al.

[11] 4,168,325

[45] Sep. 18, 1979

[54] PIMIENTO PASTE

[75] Inventors: Jose M. Gonzalez, Sevilla; Cristino L. Cortes, Cordoba, both of Spain

[73] Assignee: Medina Garvey Aceitunas, S.A., Pilas, Spain

[21] Appl. No.: 786,053

[22] Filed: Apr. 8, 1977

[30] Foreign Application Priority Data

May 26, 1976 [ES] Spain ............................ 448.251

[51] Int. Cl.$^2$ ................................................ A23L 1/04
[52] U.S. Cl. ...................................... 426/573; 426/575; 426/615; 426/803; 426/104
[58] Field of Search ............ 426/49, 102, 104, 575, 426/573, 803, 282, 615, 276, 270

[56] References Cited

U.S. PATENT DOCUMENTS

| | | | |
|---|---|---|---|
| 2,786,764 | 3/1957 | Rivoche | 426/575 |
| 3,362,831 | 1/1968 | Szczesniak | 426/575 |
| 3,932,673 | 1/1976 | Webster | 426/49 |
| 4,006,256 | 2/1977 | Kyros | 426/803 |

OTHER PUBLICATIONS

Research Disclosure, vol. 145, Industrial Opportunities, Hampshire, U.K., May 1976, pp. 33 and 72.

*Primary Examiner*—Jeanette M. Hunter
*Attorney, Agent, or Firm*—Fleit & Jacobson

[57] ABSTRACT

The invention provides a process for producing pimiento paste for use in stuffing olives. The process involves sorting and chopping pimiento, preserving it in brine, washing the preserved pimiento to desalt it, mixing the desalted pimiento with sodium alginate, guar gum, potassium sorbate, and water, and homogenizing the resulting mass until a gelatinous mixture is obtained from which any entrapped air is thereafter removed. The resulting uniform, semi-liquid paste is spread on a conveyor belt where it gradually thickens, then is submerged in a calcium chloride bath to precipitate the alginic acid, after which the paste becomes hardened, separates from the conveyor belt, and is removed.

11 Claims, No Drawings

PIMIENTO PASTE

This invention relates to a novel process for producing pimiento paste for use in stuffing Sevillian style olives.

The past for stuffing olives produced by this novel process is a substitute for the pastes currently being used which are made from oven-peeled pimientos. This inventive process guarantees a healthy, high quality product for the consumer since the paste contains the same type of pimiento mentioned above and certain non-toxic agglutinates described in detail below. The quality and quantity of these substances have been approved by the Codex Alimentarious Committee of the FAO/WHO Joint Program for Food Standards.

Among the advantages of using this novel pimiento paste are the following:

(a) Uniform color and texture of product in comparison with the same qualities in the natural oven-peeled pimiento currently being used;

(b) More efficient use of material since the substantial reduction of by-products produced makes it possible to shape this paste into very long strips which are the correct size for stuffing. These conditions are very limited in natural pimiento; and (c) Finally, the increase of production by the stuffing machines which can produce at a higher rate when provided with a more homogeneous product.

The inventive process for producing pimiento paste comprises the following three stages:

1. Preparation of the raw material.
2. Homogenization of the different ingredients.
3. Shaping the paste.

In the first stage of the inventive process, that is in the preparation of the raw material, natural oven-peeled pimiento is preferably used as the main ingredient. In this stage, the pimiento is first sorted and chopped, a procedure which varies according to the original condition of the pimiento. This step eliminates the remaining seeds, pieces of burnt skin, insects or other impurities that might affect the quality of the end product. Then, the quality of the pimiento, which is preserved in brine, is improved by successive washings with water, as by maceration or by continuous agitation, to desalt the pimiento. Microbiological control during this operation insures an aseptic, non-toxic product uncontaminated by diseases affecting the pimiento.

This preparatory stage may be considerably reduced through the use of natural oven-peeled pimiento preserved by heat treatment, that is by sterilization.

In the second stage of the inventive process, homogenization of the different ingredients of the pimiento paste is carried out, as by a crusher-mixer, to homogenize the following ingredients in the proportions, by weight, indicated hereafter:

Desalted pimiento—50.00%
Sodium alginate—7.00%
Guar gum—1.00%
Potassium sorbate—0.02%
Water: enough to make up—100%

Once a gelatinous mixture has been produced, the air trapped in the mixture is removed before proceeding to the third stage of the process. This air removal is carried out either by producing a vacuum or through compression and filtration. In this way, a semi-liquid, completely uniform paste is produced. The purpose of this "air removal" is to avoid subsequent oxidation-reduction reactions that would alter the protein-vitamin content of the pimiento.

Because the basic ingredient of the final product is natural pimiento, and since the composition of this ingredient, like all agricultural products, is not always the same due to the effect of climate, fertilizer, soil quality, etc., the percentage of the above-mentioned mixture cannot always be maintained exact. The composition of the paste is adjusted with water in order to maintain the same characteristics which as closely as possible resemble a specific model in color, texture, elasticity, refractive index, etc.

Once the operations presented in the stages described above are completed, the mixture is prepared according to the third stage of the process used in this invention.

This third stage is carried out on a white, polyester, physiologically neutral conveyor belt, suitable for use in the food industry which, preferably moves at a controlled speed of 1 meter per minute. The prepared mixture is spread on the belt by a measuring chute.

This belt, carrying the paste which thickens gradually, enters a calcium chloride bath and remains submerged in this bath resulting in the precipitation of all of the alginic acid. At this point, the process is complete.

The paste remains in the bath for approximately 12 or 15 minutes. It separates from the belt as it hardens while moving along the lower half of the conveyor.

In order to assure ease in handling, the band is cut in two smaller strips, one-half the width of the original band before the paste is stored in jars. These strips are preserved in an aqueous solution of 6% sodium chloride, 0.6% lactic acid, and approximately 1% calcium chloride.

We claim:

1. A process for preparing pimiento paste for use in stuffing olives comprising:

(a) sorting and chopping pimiento to eliminate the seeds, pieces of burnt skin, insects, and other impurities which might affect the quality of the end product;

(b) preserving the sorted and chopped pimiento in brine;

(c) successively washing the brine-preserved pimiento with water to desalt the pimiento;

(d) forming an aqueous medium containing, by weight, 50% of desalted pimiento, 7% of sodium alginate, 1% of guar gum, 0.02% of potassium sorbate and the balance being water, and homogenizing the aqueous medium until a gelatinous mixture is obtained;

(e) removing any air that may be trapped in the gelatinous mixture to prevent possible subsequent oxidation-reduction reactions that might change the protein-vitamin content of the pimiento;

(f) spreading the resulting uniform, semi-liquid paste on a conveyor belt moving at a controlled speed whereby the paste gradually thickens, then submerging the conveyor belt carrying the paste in a calcium chloride bath for approximately 12 to 15 minutes to precipitate all the alginic acid of the paste, after which the paste becomes hardened, separates from the conveyor belt, and is removed.

2. The process of claim 1 wherein the pimiento used is natural oven-peeled pimiento.

3. The process of claim 1 wherein the successive washings of the pimiento with water are carried out by maceration.

4. The process of claim 1 wherein the successive washings of the pimiento with water are carried out by agitating the pimiento-water mixture and by constant repetition of the agitation.

5. The process of claim 1 wherein the trapped air is removed by vacuum.

6. The process of claim 1 wherein the trapped air is removed by compression and filtration.

7. The process of claim 1 wherein the homogenization is carried out in a crusher-mixer.

8. The process of claim 1 wherein the paste is spread on the conveyor belt while the belt is moving at a speed of approximately 1 meter per minute.

9. The process of claim 1 wherein the paste, after being removed from the conveyor belt, is preserved in an aqueous solution containing 6% sodium chloride, 0.6% lactic acid, and approximately 1% calcium chloride.

10. A process for preparing pimiento paste for use in stuffing olives comprising:
   (a) forming an aqueous medium containing sterilized, natural, oven-peeled pimiento, sodium alginate, guar gum, and potassium sorbate and homogenizing the aqueous medium until a gelatinous mixture is obtained;
   (b) removing any air that may be trapped in the gelatinous mixture to prevent possible subsequent oxidation-reduction reactions that might change the protein-vitamin content of the pimineto; and
   (c) spreading the resulting uniform, semi-liquid paste on a conveyor belt where it gradually thickens, then submerging the conveyor belt carrying the paste in a calcium chloride bath to precipitate all the alginic acid of the paste, after which the paste becomes hardened, separates from the conveyor belt, and is removed.

11. A process for preparing pimiento paste for use in stuffing olives comprising:
   (a) forming an aqueous medium containing 50% of sterilized, natural, oven-peeled pimento, 7% of sodium alginate, 1% of guar gum, 0.02% of potassium sorbate, and enough water to make approximately 100%, and homogenizing the aqueous medium until a gelatinous mixture is obtained;
   (b) removing any air that may be trapped in the gelatinous mixture to prevent possible subsequent oxidation-reduction reactions that might change the protein-vitamin content of the pimiento;
   (c) spreading the resulting uniform, semi-liquid paste on a conveyor belt while it is moving at a speed of approximately 1 meter per minute where it gradually thickens, then submerging the conveyor belt carrying the paste in a calcium chloride bath for approximately 12 to 15 minutes to precipitate all the alginic acid of the paste, after which the paste becomes hardened, separates from the conveyor belt, and is removed; and
   (d) preserving the thus-removed paste in an aqueous solution containing 6% sodium chloride, 0.6% lactic acid, and approximately 1% calcium chloride.

* * * * *